United States Patent [19]

Tochinai et al.

[11] Patent Number: 5,021,499

[45] Date of Patent: Jun. 4, 1991

[54] HOT MELT ADHESIVE CONTAINING IMPROVED HYDROCARBON TACKIFIER RESIN

[75] Inventors: Chiaki Tochinai, Tokyo; Tadanao Kohara, Yokohama; Sadayoshi Budo, Kanagawa; Hiroaki Masuda, Yokohama; Takayoshi Yoshida, Kanagawa, all of Japan

[73] Assignee: Exxon Research and Engineering Company, Florham Park, N.J.

[21] Appl. No.: 550,237

[22] Filed: Jul. 9, 1990

Related U.S. Application Data

[60] Continuation of Ser. No. 356,092, May 24, 1989, abandoned, which is a division of Ser. No. 152,274, Feb. 4, 1988, Pat. No. 4,845,182, which is a division of Ser. No. 799,520, Nov. 19, 1985, Pat. No. 4,757,114.

[30] Foreign Application Priority Data

Nov. 21, 1984 [GB] United Kingdom ............... 8429356

[51] Int. Cl.$^5$ .................. C08L 33/00; C08L 91/06; C08L 99/00
[52] U.S. Cl. .................... 524/487; 524/489; 524/499; 524/500; 524/524; 524/225
[58] Field of Search ............... 524/275, 487, 489, 499, 524/500

[56] References Cited

U.S. PATENT DOCUMENTS

| | | | |
|---|---|---|---|
| 2,317,859 | 4/1943 | Soday | 525/267 |
| 2,338,741 | 1/1943 | Soday | 525/267 |
| 2,338,742 | 1/1944 | Soday | 525/267 |
| 2,338,743 | 1/1944 | Soday | 525/267 |
| 2,835,645 | 5/1958 | D'Ianni et al. | 525/267 |
| 3,950,453 | 4/1976 | Ishiguro et al. | 525/267 |
| 4,078,732 | 3/1978 | Lepert | 526/237 |
| 4,127,619 | 11/1978 | Godfrey | 524/481 |
| 4,157,363 | 6/1979 | Hepworth | 526/237 |
| 4,283,518 | 9/1981 | Iwashita et al. | 526/237 |
| 4,358,557 | 11/1982 | Baggs | 524/489 |
| 4,471,086 | 9/1984 | Foster | 524/489 |

FOREIGN PATENT DOCUMENTS

| | | |
|---|---|---|
| 1311025 | 3/1973 | United Kingdom . |
| 1387594 | 3/1975 | United Kingdom . |
| 1407218 | 9/1975 | United Kingdom . |

*Primary Examiner*—Allan M. Lieberman
*Attorney, Agent, or Firm*—Myron B. Kurtzman; T. Dean Simmons

[57] ABSTRACT

Hot melt adhesives containing petroleum resin tackifiers which are prepared by a process wherein (1) a $C_8$— and/or $C_9$ aromatic unsaturated hydrocarbon-containing feed (optionally containing up to 18 wt. % of $C_4$ or $C_5$ unsaturated aliphatic hydrocarbons) is first polymerized completely and thereafter a $C_5$-aliphatic unsaturated hydrocarbon-containing feed is added, polymerization continued and the reactor effluent stripped to obtain the resin. The order of polymerization may be reversed.

9 Claims, 1 Drawing Sheet

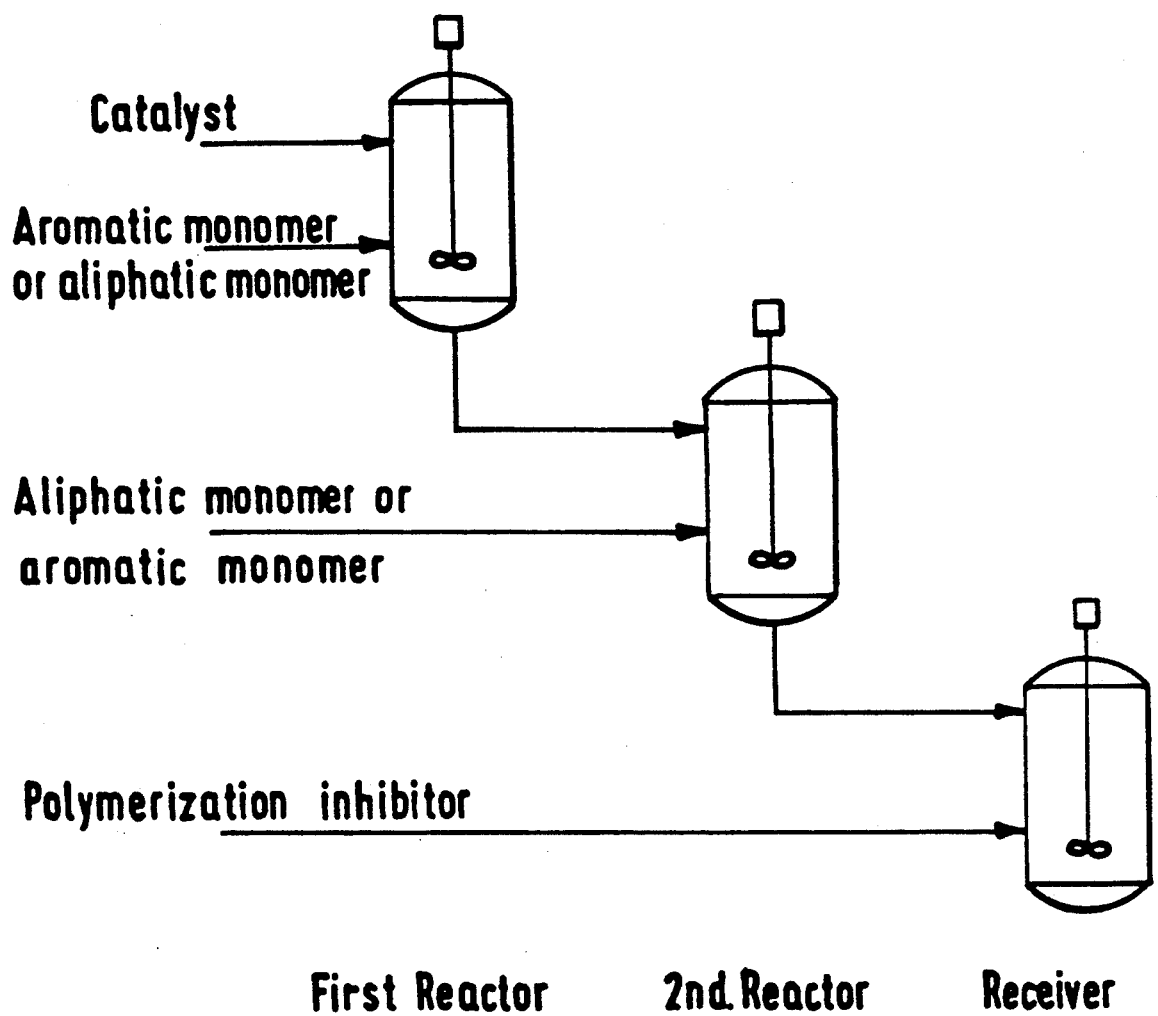

HOT MELT ADHESIVE CONTAINING IMPROVED HYDROCARBON TACKIFIER RESIN

This is a continuation of application Ser. No. 356,092 filed May 24, 1989, abandoned, which is a division of Ser. No. 152,274 filed Feb. 4, 1988, now U.S. Pat. No. 4,845,182, which is a division of Ser. No. 799,520 filed Nov. 19, 1985, now U.S. Pat. No. 4,757,114.

This invention relates to a process for preparing petroleum resins derived from unsaturated aliphatic and aromatic hydrocarbons.

More particularly this invention relates to resins comprising block copolymers which are particularly effective when combined with elastomer block copolymers as tackifiers for hot melt pressure sensitive adhesives.

U.S. Pat. No. 3,950,453 describes a process for preparing petroleum resins said to be compatible with ethylene-vinyl acetate copolymers for use in hot melt adhesives. This process involves first polymerising $C_4/C_5$ conjugated diolefins with at least one $C_4$ to $C_{10}$ monolefinic unsaturated hydrocarbon as a first feed portion and secondly polymerising said conjugated diolefins as a second feed portion, the first and second polymerisations being conducted in the presence of a Friedel-Crafts catalyst. The proportion of monolefins in the first feed portion should not be higher than 80 wt. %.

U.S. Pat. No. 2,317,857 discloses a process for preparing a resin suitable for moulding or coating by polymerising styrene with isoprene which has been previously partially polymerised catalytically with the aid of an acid-acting metallic halide catalyst such as a $BF_3$-ethyl ether complex. U.S. Pat. Nos. 2,317,858 and 2,317,859 relate to copolymers similarly prepared but using respectively butadiene and piperylene instead of isoprene.

As used herein, the hyphen format for the description of hydrocarbon streams such as "$C_8$-", "$C_9$-", and "$C_5$-" indicates "approximately" as the skilled artisan will readily recognize the described feeds to be of the type found from steam cracked naphthas. For example, feed A below, typically contains unsaturated aromatic $C_8$ and $C_9$ hydrocarbons. Feed B is recognized as the unsaturated aliphatic-type hydrocarbons also available form steam cracking and including typically the types of components give herein. When the hyphen is used in conjunction with temperatures and where a plus symbol is not used with the degrees indicated, the hyphen before such numbers indicates "about" or "approximately".

In accordance with this invention resins particularly effective for use in tackifiers for hot melt pressure sensitive adhesives and in tackifiers for solvent-based pressure senstitive adhesives are prepared by a process wherein (1) a feed A or a feed B is first polymerised completely and thereafter, either respectively feed B or feed A is added to the reaction mixture and polymerisation continued and the reactor effluent is stripped to obtain the resin. In this process feed A is a $C_8$- and/or $C_9$-aromatic unsaturated hydrocarbon-containing feed, and feed B is a $C_5$-aliphatic unsaturated hydrocarbon-containing feed provide that feed A may contain up to 18 wt. % of $C_4$ or $C_5$ unsaturated aliphatic hydrocarbons based on total weight of monomer in feed A.

Feed A i.e the $C_8$- and/or $C_9$- aromatic unsaturated hydrocarbon-containing feed can be for example styrene, styrene derivatives, petroleum distillates of 100° to 200° C. boiling points which include more than 20 wt. % of styrene and/or styrene derivatives.

One commercially available feed containing $C_8$ and $C_9$ aromatic unsaturated hydrocarbons comprises about 10 wt. % styrene, about 1.3 wt. % alpha-methyl styrene, about 11 wt. % meta vinyl toluene, about 4 wt. % para vinyl toluene, about 13 wt. % indene, about 1 wt. % di-methyl styrene about 0.5 wt. % 1-methyl indene, the remainder being mainly non-olefinic aromatic hydrocarbons.

Feed B i.e. the $C_5$-aliphatic unsaturated hydrocarbon-containing feed is typically a $C_5$ distillate in the range of −20° to 100° C. boiling points excluding cyclopentadienes, e.g. piperylene, isoprene, butadiene, hexadiene etc.

Feed A especially when polymerised first, may contain up to 18 wt. % e.g. up to 15 wt. % of $C_4$ or $C_5$ unsaturated aliphatic hydrocarbons (based on total weight of monomers in feed) such as those described above in connection with feed B. This proportion of $C_4$ or $C_5$ hydrocarbon is preferably from 2 to 10 wt. % based on the total weight of monomers in feed A.

Each feed is preferably dissolved in a diluent and such diluents may be for example aromatic hydrocarbons such as benzene, xylene, toluene; aliphatic hydrocarbons such as heptane, pentane, hexane; naphtha distillates: or halogenated hydrocarbons such as chlorobenzene.

The amount of diluent is preferably 20 to 1000 parts by weight per 100 parts by weight of monomer, more preferably 50 to 500 parts by weight per 100 parts by weight of monomer.

The polymerisations should take place in the presence of a Friedel-Crafts catalyst.

Suitable Friedel-Crafts catalysts include aluminium chloride, aluminium bromide, aluminium chloride/hydrochloric acid/aromatic hydrocarbon complex or aluminium chloride/alkyl halide/aromatic hydrocarbon complex. In the former complex the aromatic hydrocarbon is preferably an alkylated hydrocarbon, e.g. O-xylene, mesitylene, ethyl benzene or isoproyl benzene and in the latter complex the alkyl chain of the alkyl halide can be linear or branched and can vary from 1 to 30 carbon atoms.

Other suitable Friedel-Crafts catalysts are acid liquid $AlCl_3$ sludges obtained as by-products during the alkylation of benzene or any other substituted aromatics (e.g. toluene or xylene) with branched chain olefins.

Apart from aluminium trichloride, the preferred Friedel-Crafts catalyst is boron fluoride gas or a complex of $BF_3$ with aromatic compounds such as phenol.

Generally, from 0.1 to 5 wt. %, e.g. 0.2 to 1.5 wt. % of Friedel-Crafts catalyst based on the total weight of monomers is used.

In the first polymerisation the reaction temperature is preferably 0° to 100° C., more preferably 20° to 70° C. and the reaction pressure may be atmospheric or higher or lower than atmospheric.

In order to avoid the production of large quantities of $C_5$/aromatic random copolymers in the second polymerisation step which would produce a resin having poor pressure sensitive adhesion properties it is necessary for the residence time to be sufficient for complete polymerisation of feed A or feed B in the first polymerisation step. In practice a reaction time of several minutes to 12 hours, preferably 0.2 to 3 hours is usually necessary.

In the second polymerisation suitable and preferred reaction temperature, reaction pressure and reaction time are similar to those given above in connection with the first polymerisation. Usually it is not necessary to add any further catalyst but nevertheless further catalyst may be added to the second reactor if desired.

After the second polymerisation has been completed the reaction effluent should be neutralised so as to kill and eliminate the catalyst. This may be achieved by washing with aqueous solution of alkali, ammonia or sodium carbonate, or by the addition of an alcohol such as methanol and subsequent filtration.

After neutralisation the effluent should be stripped of unreacted hydrocarbons by steam stripping or vacuum distillation. This may be carried out at ambient temperature to 250° C. under an inert gas such as nitrogen gas, at atmospheric pressure. The desired resin is obtained by steam-distilling the stripped effluent e.g. at 250° C.

Usually the resin obtained has an average molecular weight (GPC method) of 500 to 2000, a softening point (JIS K-2531) of 70° to 120° C. The aromatic component in the resin may be 3 to 70 wt. %, preferably 5 to 50 wt. %.

The resins obtained can be used in many applications which require low viscosity, good flexibility and elongation before or especially after chemical modification with polar compounds such as phenols, unsaturated anhydrides such as maleic anhydride or unsaturated acids (e.g. fumaric acid). These resins are designed for a wide range of end uses and applications. They can be applied to paper, metal, thermoplastic films, Cellphane (Registered Trade Mark), polyester, PVC, woven or non woven fabrics, glass etc. and for bonding such materials together. Typical applications are hot melts, carpet backing, coating with drying oil formulations, book binding, paper sizing or in any applications involving natural or synthetic and/or rubbers such as caulks, sealants or rubber tackification.

More especially they may be used as tackifiers with natural rubber of synthetic rubbers such as polyisoproprene, EPDM, butyl, chlorobutyl, bromobutyl, neoprene and block copolymers for example styrene/isoprene rubber (Shell Cariflex (Registered Trade Mark) TR 1107) and mixture of such rubbers. Generally in such a use the resin is mixed with the rubber in amounts from 65 to 250 parts per hundred parts of rubber preferably 100 to 175 parts.

Other applications involving such resin properties are pressure sensitive adhesives, hot melt adhesives, hot melt pressure sensitive adhesives, low temperature adhesives, label adhesives, latex adhesives, surgical tapes and masking tapes where they may be blended with polymers such as ethylene/vinyl acetate copolymers and optionally with wax.

According to this invention one can use as a component in an adhesive formulation the resin prepared by the above described process.

Thus the present invention can also provide a hot melt adhesive comprising (i) an ethylene vinyl acetate copolymer, preferably 20 to 30 wt. %

(ii) wax, preferably 40 to 60 wt. % and (iii) a resin, preferably in a proportion of 20 to 30 wt. %, said resin being prepared by the above described process.

In the Figure the process of reacting the two monomers in the two separate reactors followed by inhibition of the catalyst in the receiver is schematically shown.

In the preferred manner of carrying out the process of the invention the $C_8$- and/or $C_9$ aromatic feed and catalyst are fed into the first reactor and polymerised on a continuous basis. The reactor effluent which includes live catalyst is continuously sent to the second reactor where $C_5$-aliphatic unsaturated hydrocarbon-containing feed is also fed. A mixture of the effluent and the aliphatic components are continuously polymerized in the second reactor. The order of monomer polymerisation can however be changed, i.e. aliphatic monomer polymerisation at the first reactor and aromatic monomer polymerisation at the second reactor.

In the process of aromatic monomer polymerisation, up to 15 wt. % of aliphatic monomer can be added to obtain $C_5/C_9$ random copolymer which gives better compatibility with block copolymers. After finishing the polymerisation at the second reactor, the reactor effluent from the second reactor is sent to the neutralization section where the catalyst is killed and eliminated. After that, the effluent is steam-stripped and the resin of the invention is obtained.

EXAMPLE

In this Example the reactions were performed in the manner shown in the Figure as described above. The specific reaction conditions etc. were as indicated below:

For Run 1

(i) polymerization of the 1st reactor

| Reactor size | 1 l | |
|---|---|---|
| Raw material components | styrene | 40 wt. % |
| | steam cracked naphtha (total through put 400 ml/hr) | 60 wt. % |
| Catalyst | $AlCl_3$ 1.0 wt. % per total feeds | |
| Reaction temperature | 50° C. | |
| Average residence time | 35 minutes | |

(ii) Polymerisation of the 2nd reactor

| Reactor size | 1 l |
|---|---|
| Added raw materials | $C_5$ distillates including 34 wt. % piperylene (500 ml/hr) |
| Reaction temperature | 70° C. |
| Average residence time at reactor | 63 minutes |

(iii) catalyst is decomposed in aqueous ammonia. The catalyst residue was eliminated by a centrifugal separation method. Afterwards the effluent was stripped at room temperature 250° C. under nitrogen gas. The resin of the invention was obtained by steam distillation.

This reaction was repeated in Run 2 with different feeds A and B as shown in Table 1.

The properties of the two resins obtained are also shown in Table 1.

TABLE 1

| | Run 1 | | Run 2 | |
|---|---|---|---|---|
| | 1st | 2nd | 1st | 2nd |
| Feed Components | | | | |
| Piperylene-rich $C_5$ | — | 100 | 15 | 100 |
| Styrene | 40 | — | 35 | — |
| SCN[(1)] | 60 | — | 50 | — |
| Feed Rate (ml/h) | 400 | 500 | 400 | 500 |
| Reaction Temperature (°C.) | 50 | 70 | 50 | 70 |
| Resin Properties | | | | |
| Sp.Gr. (25/4° C.) | | 1.01 | | 1.01 |
| Softening Point (°C.) | | 84.6 | | 79.6 |

TABLE 1-continued

|  | Run 1 | | Run 2 | |
| --- | --- | --- | --- | --- |
|  | 1st | 2nd | 1st | 2nd |
| Color Gardner |  | 70 |  | 5.5 |
| WCP (40/20/40)[2] |  | 70(—) |  | 70(—) |
| Styrene content |  | 36 |  | 40 |
| Mn |  | 687 |  | 730 |
| Mw |  | 1795 |  | 1839 |
| Mw/Mn |  | 2.61 |  | 2.51 |

[1]Steam cracked naphtha
[2]Wax cloud point of a blend of 40 wt. % wax, 20 wt. % resin and 40 wt. % of ethylene-vinyl acetate copolymer.

The pressure-sensitive adhesive (PSA) properties of the two resins obtained in runs 1 and 2 were determined and the results shown in Table 2 which also compares them with prior art resins.

Details of the tests were as follows:

PSA Performance Measurement

| SIS elastomer | Cariflex TR-1107 (Shell Chemicals) |
| --- | --- |
| Plasticizer | Esso process oil 765N (aromatic 9%; napahthalene 33% remainder paraffin) Esso process oil L2 (aromatic 20%, naphthalene 33% remainder paraffin) |
| Resins compared | Aliphatic type: Escorez 1310 Aromatic type |
| Tape preparation | Adhesives consisting of SIS (100)/resin (100)/oil(20) are coated on to Kraft paper. |

It can be seen that in general the resins prepared by the process of the invention (Tests 1 and 4) and blends of them with $C_5$ resin (E1310) (Tests 2,3,5 and 6) had properties superior to those of prior art resins (Tests 7, 8 and 9).

TABLE 2

|  | PSA Performance Tests | | | | | | Comparison Tests | | |
| --- | --- | --- | --- | --- | --- | --- | --- | --- | --- |
|  | 1 | 2 | 3 | 4 | 5 | 6 | 7 | 8 | 9 |
| Run 1 Resin | 100 | 75 | 50 |  |  |  |  |  |  |
| Run 2 Resin |  |  |  | 100 | 75 | 50 |  |  |  |
| $C_5$ Resin (Escorez E1310) |  | 25 | 50 |  | 75 | 50 | 100 |  | 60 |
| Aromatic resin 100% styrene |  |  |  |  |  |  |  | 100 | 40 |
| Cariflex - 1107 | 100 | 100 | 100 | 100 | 100 | 100 | 100 | 100 | 100 |
| Plasticiser (Oil) | 20 | 20 | 20 | 20 | 20 | 20 | 20 | 20 | 20 |
| PSA Performance |  |  |  |  |  |  |  |  |  |
| 180° Peel Strength (g/25 mm) 25° C. | 1610 | 1310 | 1140 | 1430 | 1400 | 1610 | 1280 | 1290 | 1190 |
| J Dow Ball Tack (No) 25° C. | 24 | 26 | 24 | 24 | 26 | 25 | 23 | 16 | 21 |
| Cohesion (min) 25° C. | >360 | >360 | >360 | 270 | 180 | >360 | 110 | 0 | 0 |
| Shear Adhesion (min) 25° C. | >360 | 360 | 300 | >360 | >360 | 300 | 40 | 350 | 260 |

COMPARATIVE EXAMPLE

To compare the properties of the resins prepared by the process of this invention, i.e. two step polymerisation, with resins prepared by one step polymerisation a feed of $C_5$ distillates and styrene in which the styrene content was 44 wt. % was polymerized using an $AlCl_3$ catalyst.

The PSA properties obtained were as follows:
180° C. Peel Strength at 25° C. (1): 1300 g/25 mm
J Dow Ball Tack No at 25° C. (2): 20
Cohesion at 25° C. (3): 18 min
Shear adhesion at 40° C. (4): 52 min
(1) Peel Strength PSTC No. 1
(2) Ball Tack J Dow method
(3) Cohesion PSTC method - (Stainless Steel panel, Kraft paper specimen 25 mm×25 mm, at room temperature weight 1 Kg)
(4) Shear adhesion at 40° C.: similar to PSTC cohesion method but us K-liner cardboard as test panels. Test specimen is Kraft tape 25 mm×25 mm. Weight 1 Kg. Measure time until specimens fall down at 40° C.

It can be readily seen that the resins produced by the process of the invention have superior properties compared with those of a similar resin but prepared in a one step polymerisation process.

We claim:

1. In a hot melt adhesive comprising:
   (i) an ethylene vinyl acetate copolymer,
   (ii) wax, and
   (iii) an improved resin tackifier, wherein said resin is a block copolymer tackifier resin from a reaction mixture wherein a feed A or feed B is polymerized completely in the presence of a Friedel-Crafts catalyst and thereafter either respectively feed B or feed A is added to the reaction mixture and polymerization continued and the reactor effluent is stripped to obtain the resin, said feed A being a feed of about $C_8$ or $C_9$ aromatic, unsaturated, hydrocarbon-containing feed, and feed B being a feed of about $C_5$ aliphatic unsaturated hydrocarbon-containing feed, provided that feed A may contain up to 18 wt. % of $C_4$ or $C_5$ unsaturated aliphatic hydrocarbons based on the total weight of monomers in feed A.

2. The hot melt adhesive of claim 1 wherein the ethylene vinyl acetate copolymer comprises about 20 to 30 wt. % of the adhesive.

3. The hot melt adhesive of claim 1 wherein the wax comprises about 40 to 60 wt. % of the adhesive.

4. The hot melt adhesive of claim 1 wherein the resin comprises about 20 to 30 wt. % of the adhesive.

5. The hot melt adhesive of claim 4 wherein the wax comprises about 40 to 60 wt. % and the ethylene vinyl acetate copolymer comprises about 20 to 30 wt. % of the adhesive.

6. The hot melt adhesive of claim 1 wherein the resin feed A comprises about 10 wt. % styrene, about 1.3 wt. % alpha methyl styrene, about 11 wt. % meta vinyl toluene, about 4 wt. % para vinyl toluene, about 13 wt. % indene, about 1 wt. % di-methyl styrene, about 0.5 wt. % 1-methyl styrene, and the balance mainly non-olefinic aromatic hydrocarbons.

7. A hot melt adhesive of claim 1 wherein the resin feed B comprises a $C_5$ distillate in the range of about 100° C. boiling points.

8. A hot melt adhesive of claim 1 wherein the resin feed A contains up to 15 wt. % of $C_4$ or $C_5$ saturated aliphatic hydrocarbons.

9. A hot melt adhesive according to claim 1 wherein the resin has an average molecular weight of 500 to 2,000 a softening point of 70° to 120° C., and an aromatic content of 3 to 70 wt. %.

* * * * *